(12) United States Patent
Braun

(10) Patent No.: US 6,634,305 B1
(45) Date of Patent: Oct. 21, 2003

(54) SEED PLANTING SYSTEM

(76) Inventor: John E. Braun, 24 Major Rd., Monmouth Junction, NJ (US) 08852

(*) Notice: Subject to any disclaimer, the term of this patent is extended or adjusted under 35 U.S.C. 154(b) by 0 days.

(21) Appl. No.: 10/122,922

(22) Filed: Apr. 12, 2002

(51) Int. Cl.[7] ............................................ A01C 11/02
(52) U.S. Cl. ........................ 111/105; 111/104; 47/65.5
(58) Field of Search ................... 111/149, 156, 111/190, 197, 14, 104, 105; 47/65.5, 66.7

(56) References Cited

U.S. PATENT DOCUMENTS

| | | | |
|---|---|---|---|
| 3,258,162 A | | 6/1966 | Beasley |
| 3,749,035 A | | 7/1973 | Cayton et al. |
| 4,145,980 A | | 3/1979 | Boots |
| 4,363,341 A | * | 12/1982 | Powell ........................ 141/78 |
| 4,436,040 A | | 3/1984 | Chumley |
| D275,070 S | | 8/1984 | Brown |
| 4,497,265 A | | 2/1985 | Hood, Jr. et al. |
| 4,703,704 A | * | 11/1987 | Mielke et al. ............... 111/179 |
| 4,926,583 A | * | 5/1990 | Hamilton ..................... 221/278 |
| 5,048,226 A | * | 9/1991 | Hamilton ..................... 221/211 |
| 5,573,558 A | * | 11/1996 | Huang ...................... 47/1.01 R |
| 5,651,401 A | * | 7/1997 | Cados ......................... 141/129 |
| 5,765,491 A | * | 6/1998 | Brower et al. ............... 111/105 |
| 6,520,111 B2 | * | 2/2003 | Lang ........................... 118/13 |

FOREIGN PATENT DOCUMENTS

| | | | | |
|---|---|---|---|---|
| DE | 3429028 A | * | 2/1986 | ............ A01C/7/08 |
| DE | 3601033 A | * | 8/1986 | ............ A01C/7/08 |
| GB | 2084842 A | * | 4/1982 | ............ A01C/7/04 |
| GB | 2309147 A | * | 7/1997 | ............ A01C/7/04 |
| JP | 07227108 A | * | 8/1995 | ............ A01C/7/04 |

* cited by examiner

Primary Examiner—Thomas B. Will
Assistant Examiner—Alexandra K. Pechhold

(57) ABSTRACT

A seed planting system for planting seeds in dirt in the depressions of a flat. The seed planting system includes a plurality of seeding assemblies each having a hopper. The hopper is designed for holding the seeds. Each of the seeding assemblies has dispensing portion. The dispensing portion is coupled to the hopper of an associated one of the seeding assemblies whereby the dispensing portion is designed for dispensing seeds from the hopper of the associated one of the seeding assemblies into the depressions of the flat. A regulating assembly is coupled between the hopper and the dispensing portion of each of the seeding assemblies whereby the regulating assembly is designed for regulating the rate at which the seeds are dispensed from the hopper to the dispensing portion of the associated one of the seeding assemblies.

18 Claims, 6 Drawing Sheets

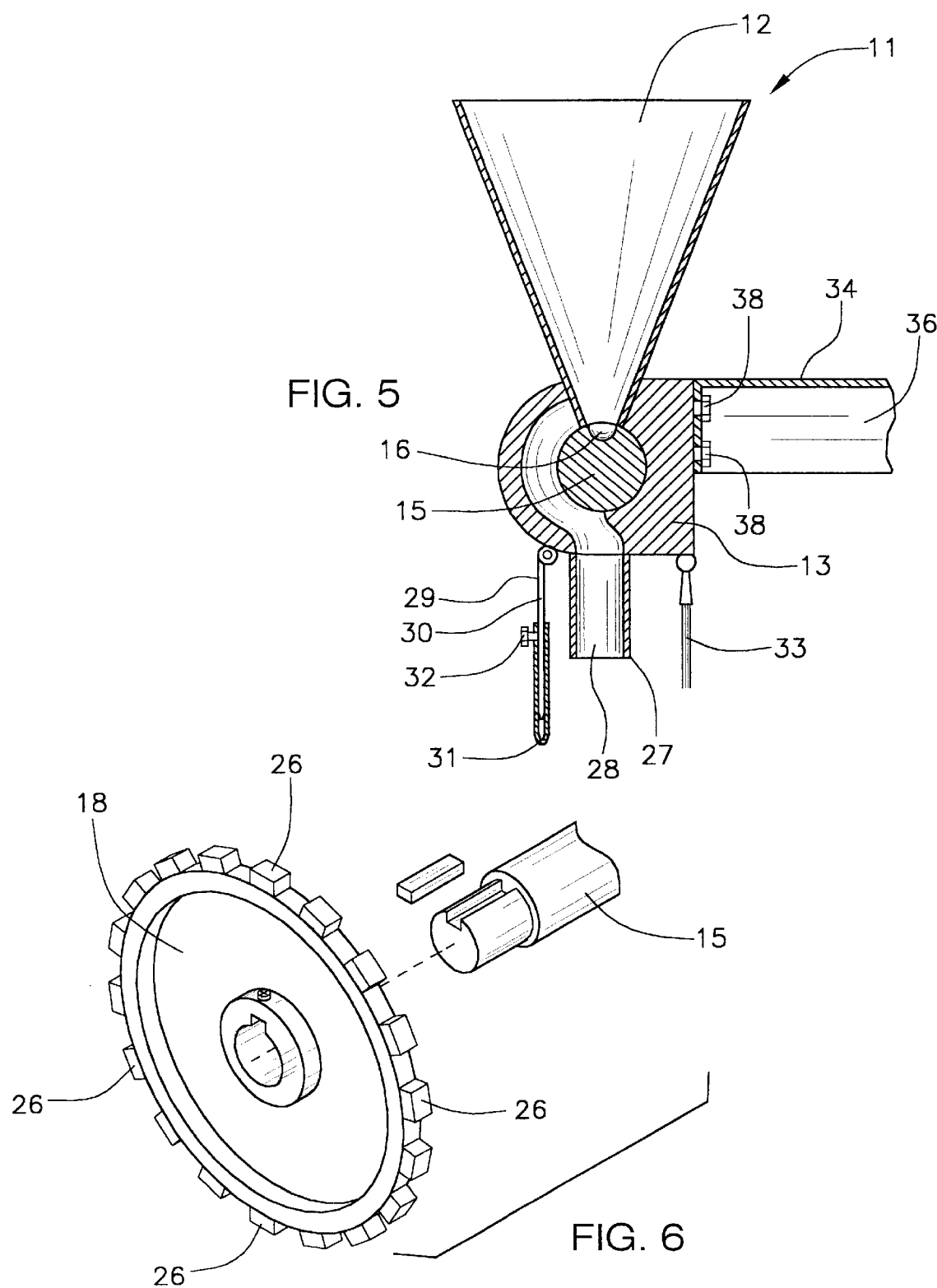

SEED PLANTING SYSTEM

BACKGROUND OF THE INVENTION

1. Field of the Invention

The present invention relates to seed planters and more particularly pertains to a new seed planting system for planting seeds in dirt in the depressions of a flat.

2. Description of the Prior Art

The use of seed planters is known in the prior art. U.S. Pat. No. 3,749,035 describes a system for digging a furrow in the ground and depositing seeds in the furrow. Another type of seed planter is U.S. Pat. No. 4,145,980 having a vacuum assembly for selectively collecting seeds for depositing in the ground in precise increments. U.S. Pat. No. 4,497,265 has a cylindrical container with a metering plate positioned under the cylindrical container for metering the size of the seeds being dispensed from the cylindrical container. U.S. Pat. No. 4,436,040 has a device for seeding of a large area as the device is driven over the area. U.S. Pat. No. 3,258,162 has a metering device for metering the deposition of granular material. U.S. Pat. No. Des. 275,070 shows a hand seeder.

While these devices fulfill their respective, particular objectives and requirements, the need remains for a system that has certain improved features allowing for facilitating changing of the interval at which seeds are planted.

SUMMARY OF THE INVENTION

The present invention meets the needs presented above by providing wheels having varying diameters to allow rotation of the shaft at different rates allowing for seeds to be deposited at different intervals corresponding to the diameter of the wheels being used.

Still yet another object of the present invention is to provide a new seed planting system that facilitates planting of seeds in a flat.

Even still another object of the present invention is to provide a new seed planting system that maintains alignment of the seeding assemblies with the flat while being used.

To this end, the present invention generally comprises a plurality of seeding assemblies each having a hopper. The hopper is designed for holding the seeds. Each of the seeding assemblies has dispensing portion. The dispensing portion is coupled to the hopper of an associated one of the seeding assemblies whereby the dispensing portion is designed for dispensing seeds from the hopper of the associated one of the seeding assemblies into the depressions of the flat. A regulating assembly is coupled between the hopper and the dispensing portion of each of the seeding assemblies whereby the regulating assembly is designed for regulating the rate at which the seeds are dispensed from the hopper to the dispensing portion of the associated one of the seeding assemblies.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view of one of the seed assemblies of the present invention taken along line 5—5 of FIG. 3.

FIG. 6 is an exploded perspective view of one of the wheels and the shaft of the present invention.

DESCRIPTION OF THE PREFERRED EMBODIMENT

Figure 1:
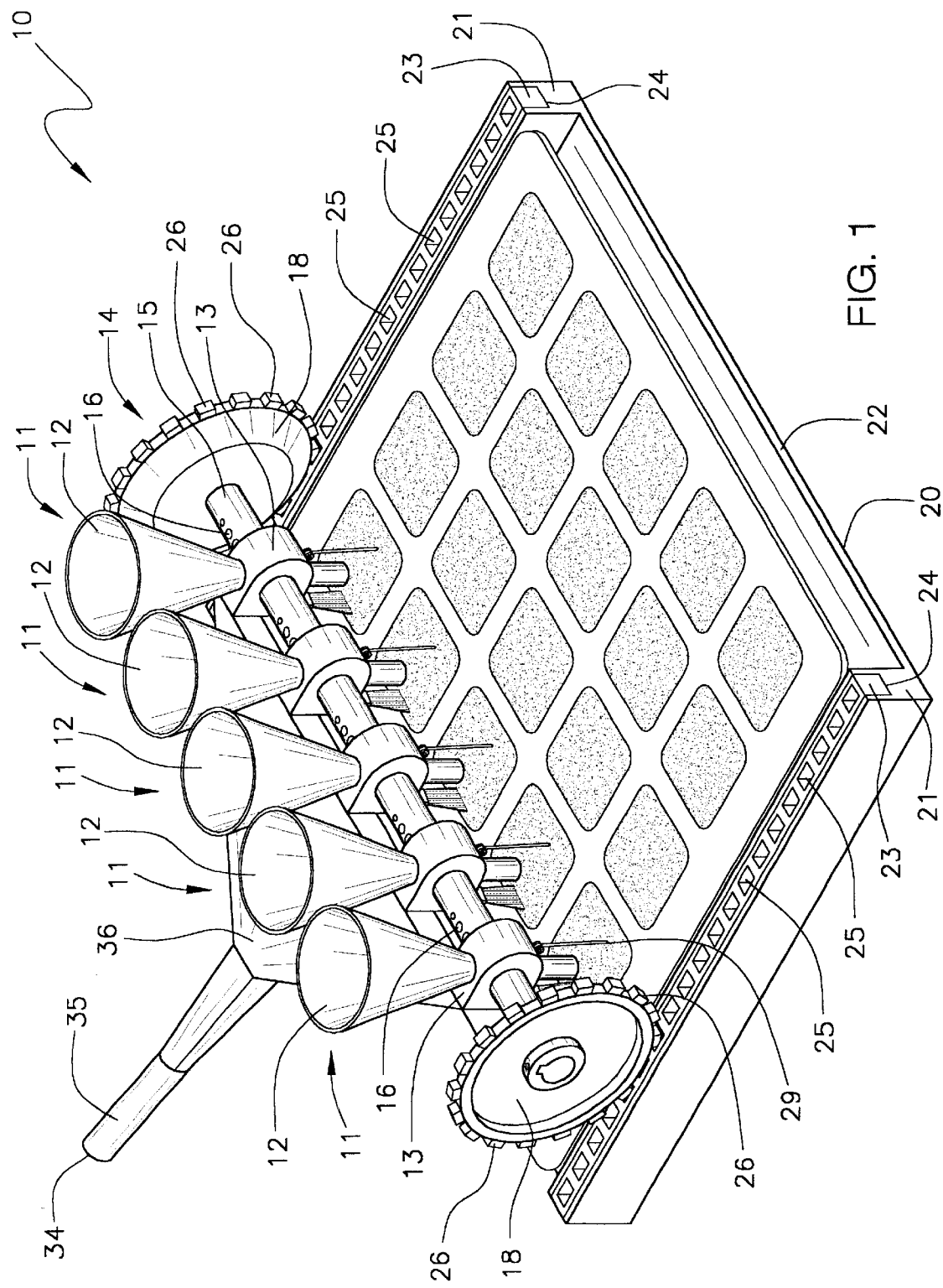
FIG. 1 is a front perspective view of a new seed planting system according to the present invention shown in use.
Figure 2:
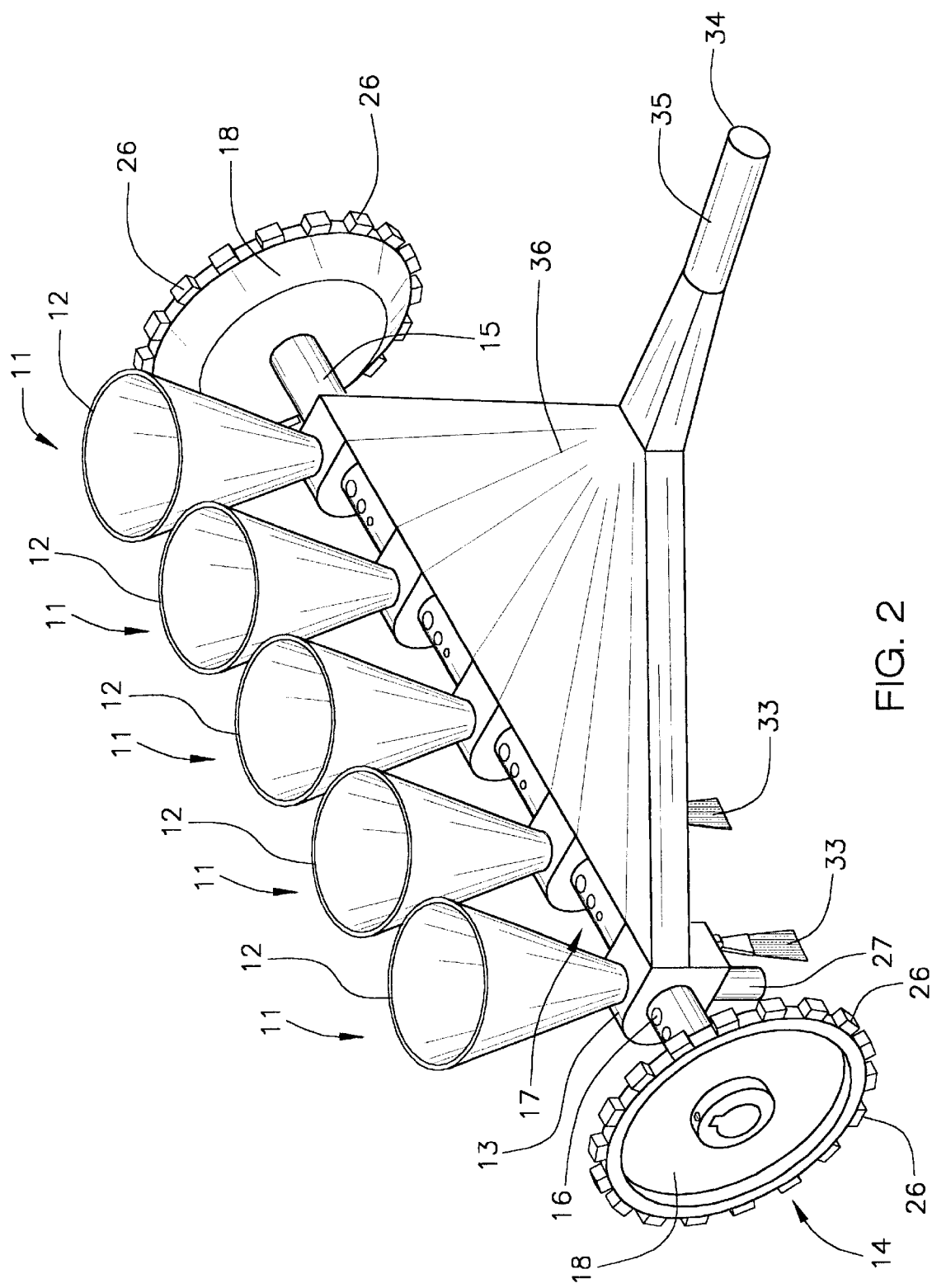
FIG. 2 is a rear perspective view of the present invention.
Figure 3:
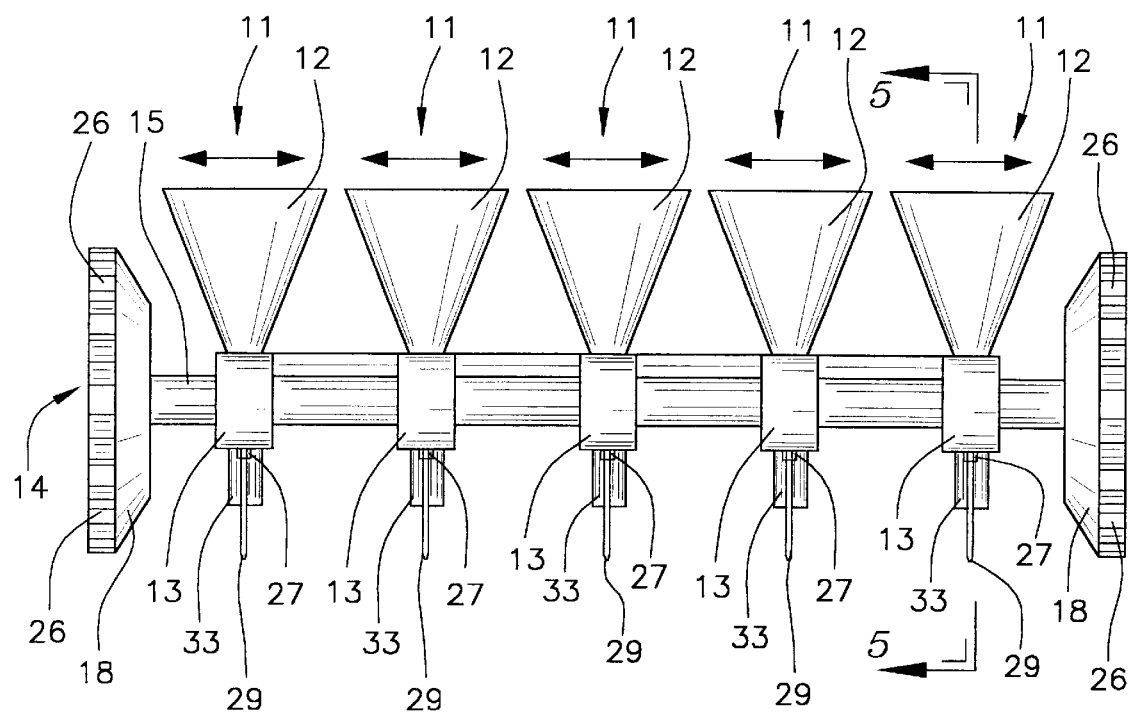
FIG. 3 is a front view of the present invention.
Figure 4:
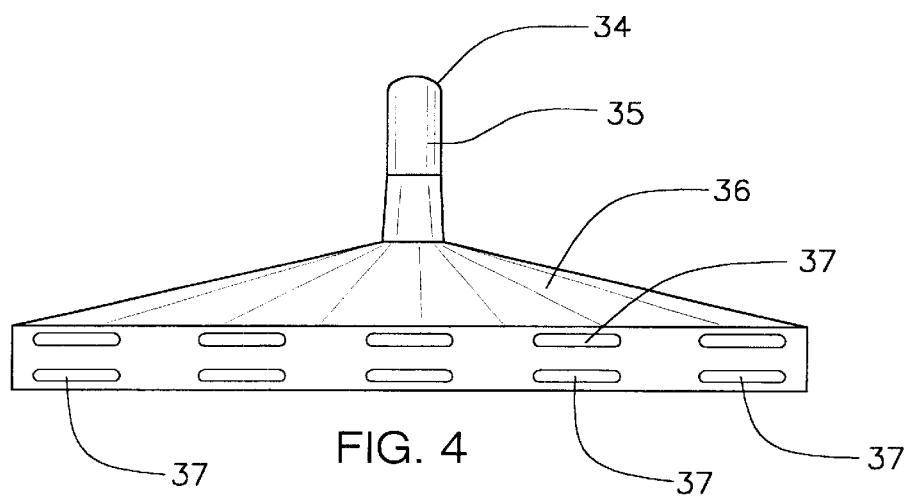
FIG. 4 is a front view of the handle member of the present invention.
Figure 7:
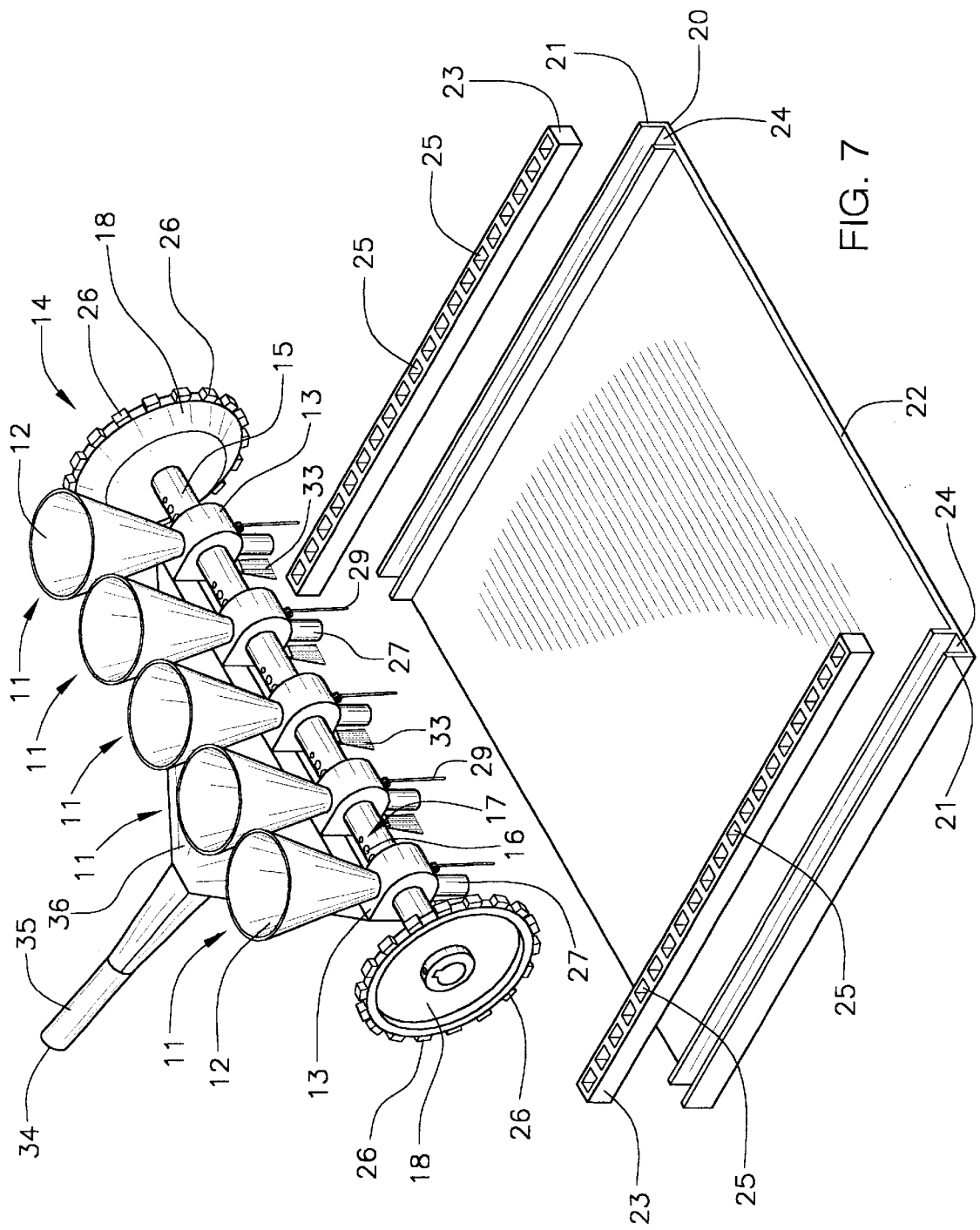
FIG. 7 is a exploded perspective view of the present invention.
Figure 8:
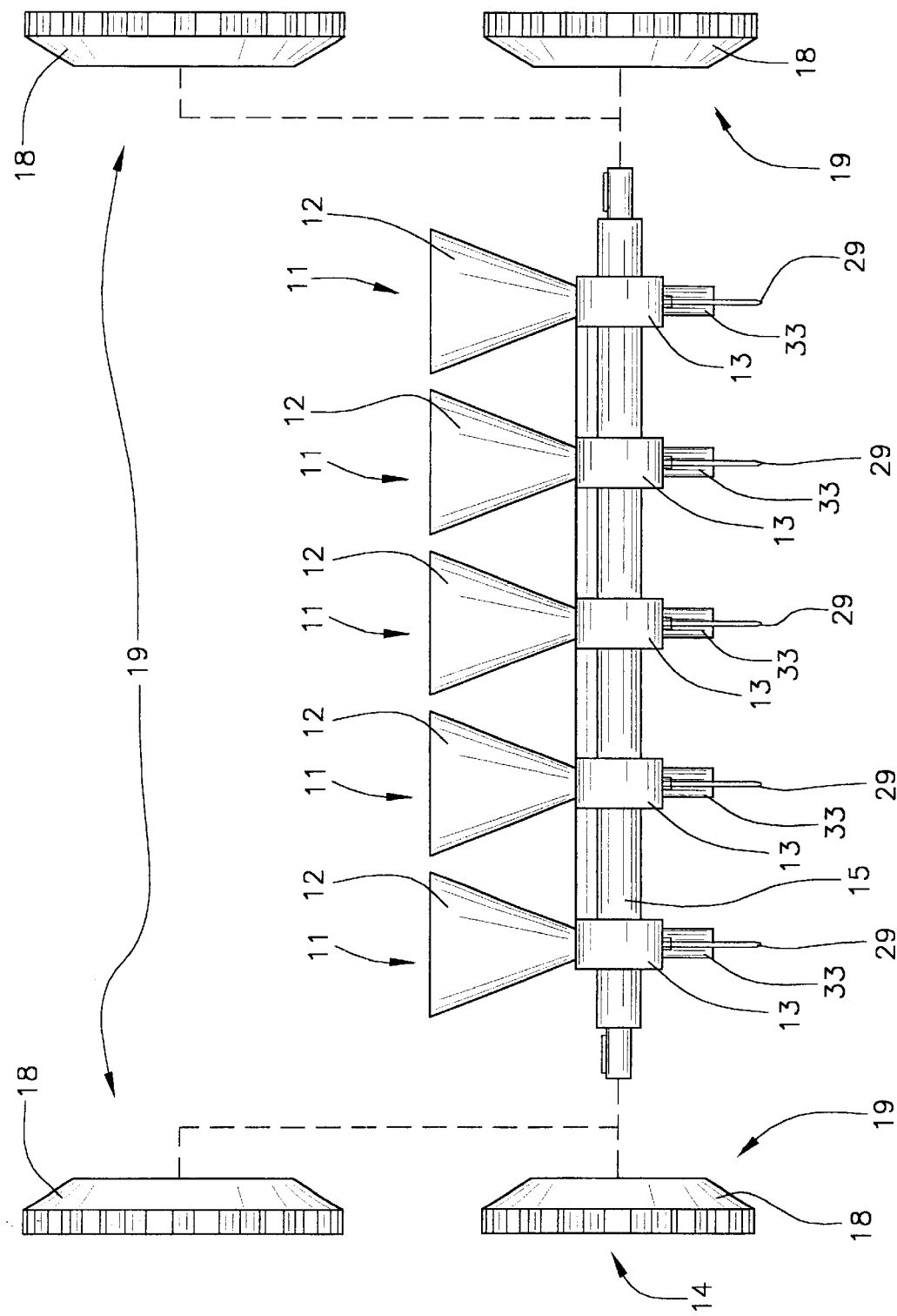
FIG. 8 is an exploded front view of the sets of wheels of the present invention.

With reference now to the drawings, and in particular to FIGS. 1 through 8 thereof, a new seed planting system embodying the principles and concepts of the present invention and generally designated by the reference numeral 10 will be described.

As best illustrated in FIGS. 1 through 8, the seed planting system 10 generally comprises a plurality of seeding assemblies 11 each having a hopper 12. The hopper 12 is designed for holding the seeds. Each of the seeding assemblies 11 has dispensing portion 13. The dispensing portion 13 is coupled to the hopper 12 of an associated one of the seeding assemblies 11 whereby the dispensing portion 13 is designed for dispensing seeds from the hopper 12 of the associated one of the seeding assemblies 11 into the depressions of the flat.

A regulating assembly 14 is coupled between the hopper 12 and the dispensing portion 13 of each of the seeding assemblies 11 whereby the regulating assembly 14 is designed for regulating the rate at which the seeds are dispensed from the hopper 12 to the dispensing portion 13 of the associated one of the seeding assemblies 11.

The regulating assembly 14 has a shaft 15. The shaft 15 rotatably extends through the dispensing portion 13 of each of the seeding assemblies 11. The shaft 15 has a plurality of indentations 16. Each of the seeding assemblies 11 is slidably coupled to the shaft 15 of the regulating assembly 14 whereby each of the seeding assemblies 11 is alignable with one of the indentations 16. Each of the indentations 16 aligned with one of the seeding assemblies 11 designed for collecting one of the seeds from the hopper 12 of the associated one of the seeding assemblies 11 and transferring the seed from the hopper 12 to the dispensing portion 13 when the shaft 15 of the regulating assembly 14 is rotated with respect to the seeding assemblies 11.

The plurality of indentations 16 are arranged in a plurality of indentation sets 17. Each of the indentations 16 of each of the indentation sets 17 has a unique diameter from the other of the indentations 16 of the associated one of the indentation sets 17 whereby each of the indentations 16 of the associated one of the indentation sets 17 is designed for collecting seeds of a size less than the diameter of the associated one of the indentations 16 of the indentation sets 17 for inhibiting more than one seed being collected.

The regulating assembly 14 has a plurality of wheels 18. Each of the wheels 18 is couplable to opposing ends of the shaft 15 of the regulating assembly 14. The wheels 18 are designed for extending beyond opposing sides of the flat whereby the wheels 18 permit the seeding assemblies 11 to be advanced across the flat and rotate the shaft 15 of the regulating member for regulating a seed from each of the seeding assemblies 11 being deposited into an associated one of the depressions of the flat.

The plurality of wheels 18 are arranged in a plurality of wheel sets 19. The wheels 18 of each of the wheel sets 19 has a diameter unique from a diameter of the wheels 18 of each other of the wheel sets 19 whereby the wheels 18 of each of the wheel sets 19 rotates the shaft 15 at a different rate than each other of the wheel sets 19 for dispensing seeds at different intervals when the wheels 18 of the associated wheel set are coupled to the shaft 15.

A tray member 20 is designed for receiving the flat. The tray member 20 has a pair of side portions 21. Each of the side portions 21 is positioned adjacent opposing side edges of a support portion 22 of the tray member 20 whereby the flat is positioned between the side portions 21 when the support portion 22 of the tray member 20 is supporting the flat. Each of the wheels 18 engages one of the side portions 21 of the tray member 20 whereby each of the wheels 18 rolls along the associated one of the side portions 21 designed for guiding the seeding assemblies 11 over the flat.

The tray member 20 has a plurality inserts 23. Each of the side portions 21 of the tray member 20 has a channel 24 whereby the channel 24 of each of the side portions 21 receives one of the inserts 23. Each of the inserts 23 has a plurality of holes 25. The holes 25 are positioned in a spaced relationship along a length of the associated one of the inserts 23. Each of the holes 25 receives one of a plurality of teeth 26 of the associated one of the wheels 18 for maintaining alignment of each of the wheels with the side portions 21 of the tray member 20.

The dispensing portion 13 of each of the seeding assemblies 11 has a dispensing tube 27. The dispensing tube 27 has a lumen in communication with the associated one of the indentations 16 of the shaft 15 when the associated one of the indentations 16 is rotated past the hopper 12 of the associated one of the seeding assemblies 11. The dispensing tube 27 is designed for dispensing a seed collected by the associated one of the indentations 16 into one of the depressions of the flat when the associated one of the indentations 16 is rotated past the hopper 12 of the associated one of the seeding assemblies 11.

Each of the seeding assemblies 11 has a perforation member 29. The perforation member 29 extends from the dispensing portion 13 of the associated one of the seeding assemblies 11. The perforation member 29 is designed for forming a trench in the dirt in an associated one of the depressions of the tray whereby the dispensing portion 13 of the associated one of the seed assemblies dispenses one of the seeds into the trench formed in the dirt.

The perforation member 29 of each of the seeding assemblies 11 has a base portion 30 and a sheath portion 31. The base portion 30 of the perforation member 29 is coupled to the dispensing portion 13 of the associated one of the seeding assemblies 11. The sheath portion 31 is slidably coupled to the base portion 30 for adjusting a length of the perforation member 29. A set screw 32 extends through the sheath portion 31 and engages the base portion 30 for securing the sheath portion 31 to the base portion 30 at a desired length. The base portion 30 may be biased with respect to the dispensing portion 13 of the associated one of the seeding assemblies 11 so that the perforation member 29 pivots up when the perforation member 29 strikes a partition wall between the depressions of the flat for inhibiting damage being caused to either the flat or the perforation member 29.

Each of the seeding assemblies 11 has a brush member 33. The brush member 33 is positioned opposite the perforation member 29. The brush member 33 is designed for brushing dirt pushed aside by the perforation member 29 back into the trench after the seed has been dispensed by the dispensing portion 13 of the associated one of the seeding assemblies 11.

A handle member 34 is coupled to each of the seeding assemblies 11. The handle member 34 is designed for being gripped by a user whereby the handle member 34 permits the user to control the seeding assemblies 11 when the seeding assemblies 11 is passed over the flat.

The handle member 34 has a hand portion 35 and a connection portion 36. The connection portion 36 is for coupling to the seeding assemblies 11. The hand portion 35 extends from the connection portion 36 opposite the seeding assemblies 11. The hand portion 35 is designed for being engaged by the hand of the user when the user wishes to deposit seeds in the depressions of the flat.

The connection portion 36 of the handle member 34 has a plurality of slots 37. Each of the seeding assemblies 11 is selectively positionable adjacent one of the slots 37. A plurality of fastener members 38 extend through the slots 37 into the associated one of the seeding assemblies 11 for coupling the seeding assemblies 11 to the connection portion 36 of the handle member 34. Each of the seeding assemblies 11 are laterally positionable along a length of the associated one of the slots 37.

In use, the user positions the seeding assemblies 11 so that the seeding assemblies 11 are aligned with the columns of depressions of the flat. Hopper 12s are then filed with the desired seeds to be planted. The wheels 18 having the correct diameter for correctly depositing the seed in each of the depressions in a column of the flat are coupled to the shaft 15. The wheels 18 are then placed on the side portions 21 of the tray member 20 with the teeth 26 of each of the wheels 18 engaging the holes 25 of the associated one of the inserts 23. The user then pushes the handle member 34 to advance the seeding assemblies 11 along the flat to plant the seeds in the dirt in the depressions of the flat.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seed planting system for planting seeds in dirt positioned in depressions in a flat, said seed planting system comprising:

a plurality of seeding assemblies each having a hopper, said hopper being adapted for holding the seeds, each of said seeding assemblies having dispensing portion, said dispensing portion being coupled to said hopper of an associated one of said seeding assemblies such that said dispensing portion is adapted for dispensing seeds from said hopper of the associated one of said seeding assemblies into the depressions of the flat;

a regulating assembly being coupled between said hopper and said dispensing portion of each of said seeding assemblies such that said regulating assembly is adapted for regulating the rate at which the seeds are dispensed from said hopper to said dispensing portion of the associated one of said seeding assemblies;

each of said seeding assemblies having a perforation member, said perforation member extending from said dispensing portion of the associated one of said seeding assemblies, said perforation member being adapted for forming a trench in the dirt in an associated one of the depressions of the tray such that said dispensing portion of the associated one of said seed assemblies dispenses one of the seeds into the trench formed in the dirt; and each of said seeding assemblies having a brush member, said brush member being positioned opposite said perforation member, said brush member being adapted for brushing dirt pushed aside by said perforation member back into the trench after the seed has been dispensed by said dispensing portion of the associated one of said seeding assemblies.

2. The seed planting system as set forth in claim 1, further comprising:

said regulating assembly having a shaft, said shaft rotatably extending through said dispensing portion of each of said seeding assemblies, said shaft having a plurality of indentations, each of said seeding assemblies being slidably coupled to said shaft of said regulating assembly such that each of said seeding assemblies is alignable with one of said indentations, each of said indentations aligned with one of said seeding assemblies being adapted for collecting one of the seeds from said hopper of the associated one of said seeding assemblies and transferring the seed from said hopper to said dispensing portion when said shaft of said regulating assembly is rotated with respect to the seeding assemblies.

3. The seed planting system as set forth in claim 2, further comprising:

said regulating assembly having a plurality of wheels, each of said wheels being couplable to opposing ends of said shaft of said regulating assembly, said wheels being adapted for extending beyond opposing sides of the flat such that said wheels permit said seeding assemblies to be advanced across the flat and rotate said shaft of said regulating member for regulating a seed from each of said seeding assemblies being deposited into an associated one of the depressions of the flat.

4. The seed planting system as set forth in claim 3, further comprising:

a tray member being adapted for receiving the flat, said tray member having a pair of side portions, each of said side portions being positioned adjacent opposing side edges of a support portion of said tray member such that said flat is positioned between said side portions when said support portion of said tray member is supporting the flat, each of said wheels engaging one of said side portions of said tray member such that each of said wheels rolls along the associated one of said side portions adapted for guiding said seeding assemblies over the flat.

5. The seed planting system as set forth in claim 4, further comprising:

said tray member having a plurality inserts, each of said side portions of said tray member having a channel such that said channel of each of said side portions receives one of said inserts, each of said inserts having a plurality of holes, said holes being positioned in a spaced relationship along a length of the associated one of said inserts, each of said holes receiving one of a plurality of teeth of the associated one of said wheels for maintaining alignment of each of said wheels with said side portions of said tray member.

6. The seed planting system as set forth in claim 3, further comprising:

said plurality of wheels being arranged in a plurality of wheel sets, said wheels of each of said wheel sets having a diameter unique from a diameter of said wheels of each other of said wheel sets such that said wheels of each of said wheel sets rotates said shaft at a different rate than each other of said wheel sets for dispensing seeds at different intervals when said wheels of the associated wheel set are coupled to said shaft.

7. The seed planting system as set forth in claim 2, further comprising:

said plurality of indentations being arranged in a plurality of indentation sets, each of said indentations of each of said indentation sets having a unique diameter from the other of said indentations of the associated one of said indentation sets such that each of said indentations of the associated one of said indentation sets is adapted for collecting seeds of a size less than the diameter of the associated one of said indentations of said indentation sets for inhibiting more than one seed being collected.

8. The seed planting system as set forth in claim 2, further comprising:

said dispensing portion of each of said seeding assemblies having a dispensing tube, said dispensing tube having a lumen in communication with the associated one of said indentations of said shaft when the associated one of said indentations is rotated past said hopper of the associated one of said seeding assemblies, said dispensing tube being adapted for dispensing a seed collected by the associated one of said indentations into one of the depressions of the flat when the associated one of said indentations is rotated past said hopper of the associated one of said seeding assemblies.

9. The seed planting system as set forth in claim 1, further comprising:

said perforation member of each of said seeding assemblies having a base portion and a sheath portion, said base portion of said perforation member being coupled to said dispensing portion of the associated one of said seeding assemblies, said sheath portion being slidably coupled to said base portion for adjusting a length of said perforation member.

10. The seed planting system as set forth in claim 1, further comprising:

a handle member being coupled to each of said seeding assemblies, said handle member being adapted for being gripped by a user such that said handle member permits the user to control said seeding assemblies when said seeding assemblies is passed over the flat.

11. The seed planting system as set forth in claim 10, further comprising:

said handle member having a hand portion and a connection portion, said connection portion being for coupling to said seeding assemblies, said hand portion extending from said connection portion opposite said seeding assemblies, said hand portion being adapted for being engaged by the hand of the user when the user wishes to deposit seeds in the depressions of the flat.

12. The seed planting system as set forth in claim 11, further comprising:

said connection portion of said handle member having a plurality of slots, each of said seeding assemblies being selectively positionable adjacent one of said slots, a plurality of fastener members extending through said slots into the associated one of said seeding assemblies for coupling said seeding assemblies to said connection portion of said handle member, each of said seeding assemblies being laterally positionable along a length of the associated one of said slots.

13. The seed planting system as set forth in claim 1, further comprising:

said regulating assembly having a shaft, said shaft rotatably extending through said dispensing portion of each of said seeding assemblies, said shaft having a plurality of indentations, each of said seeding assemblies being slidably coupled to said shaft of said regulating assembly such that each of said seeding assemblies is alignable with one of said indentations, each of said indentations aligned with one of said seeding assemblies being adapted for collecting one of the seeds from said hopper of the associated one of said seeding assemblies and transferring the seed from said hopper to said dispensing portion when said shaft of said regulating assembly is rotated with respect to the seeding assemblies;

said plurality of indentations being arranged in a plurality of indentation sets, each of said indentations of each of said indentation sets having a unique diameter from the other of said indentations of the associated one of said indentation sets such that each of said indentations of the associated one of said indentation sets is adapted for collecting seeds of a size less than the diameter of the associated one of said indentations of said indentation sets for inhibiting more than one seed being collected;

said regulating assembly having a plurality of wheels, each of said wheels being couplable to opposing ends of said shaft of said regulating assembly, said wheels being adapted for extending beyond opposing sides of the flat such that said wheels permit said seeding assemblies to be advanced across the flat and rotate said shaft of said regulating member for regulating a seed from each of said seeding assemblies being deposited into an associated one of the depressions of the flat;

said plurality of wheels being arranged in a plurality of wheel sets, said wheels of each of said wheel sets having a diameter unique from a diameter of said wheels of each other of said wheel sets such that said wheels of each of said wheel sets rotates said shaft at a different rate than each other of said wheel sets for dispensing seeds at different intervals when said wheels of the associated wheel set are coupled to said shaft;

a tray member being adapted for receiving the flat, said tray member having a pair of side portions, each of said side portions being positioned adjacent opposing side edges of a support portion of said tray member such that said flat is positioned between said side portions when said support portion of said tray member is supporting the flat, each of said wheels engaging one of said side portions of said tray member such that each of said wheels rolls along the associated one of said side portions adapted for guiding said seeding assemblies over the flat;

said tray member having a plurality inserts, each of said side portions of said tray member having a channel such that said channel of each of said side portions receives one of said inserts, each of said inserts having a plurality of holes, said holes being positioned in a spaced relationship along a length of the associated one of said inserts, each of said holes receiving one of a plurality of teeth of the associated one of said wheels for maintaining alignment of each of said wheels with said side portions of said tray member;

said dispensing portion of each of said seeding assemblies having a dispensing tube, said dispensing tube having a lumen in communication with the associated one of said indentations of said shaft when the associated one of said indentations is rotated past said hopper of the associated one of said seeding assemblies, said dispensing tube being adapted for dispensing a seed collected by the associated one of said indentations into one of the depressions of the flat when the associated one of said indentations is rotated past said hopper of the associated one of said seeding assemblies;

said perforation member of each of said seeding assemblies having a base portion and a sheath portion, said base portion of said perforation member being coupled to said dispensing portion of the associated one of said seeding assemblies, said sheath portion being slidably coupled to said base portion for adjusting a length of said perforation member;

a handle member being coupled to each of said seeding assemblies, said handle member being adapted for being gripped by a user such that said handle member permits the user to control said seeding assemblies when said seeding assemblies is passed over the flat;

said handle member having a hand portion and a connection portion, said connection portion being for coupling to said seeding assemblies, said hand portion extending from said connection portion opposite said seeding assemblies, said hand portion being adapted for being engaged by the hand of the user when the user wishes to deposit seeds in the depressions of the flat; and said connection portion of said handle member having a plurality of slots, each of said seeding assemblies being selectively positionable adjacent one of said slots, a plurality of fastener members extending through said slots into the associated one of said seeding assemblies for coupling said seeding assemblies to said connection portion of said handle member, each of said seeding assemblies being laterally positionable along a length of the associated one of said slots.

14. A seed planting system for planting seeds in dirt positioned in depressions in a flat, said seed planting system comprising:

a plurality of seeding assemblies each having a hopper, said hopper being adapted for holding the seeds, each of said seeding assemblies having dispensing portion, said dispensing portion being coupled to said hopper of an associated one of said seeding assemblies such that said dispensing portion is adapted for dispensing seeds from said hopper of the associated one of said seeding assemblies into the depressions of the flat;

a regulating assembly being coupled between said hopper and said dispensing portion of each of said seeding assemblies such that said regulating assembly is adapted for regulating the rate at which the seeds are dispensed from said hopper to said dispensing portion of the associated one of said seeding assemblies;

said regulating assembly having a shaft, said shaft rotatably extending through said dispensing portion of each of said seeding assemblies, said shaft having a plurality of indentations, each of said seeding assemblies being slidably coupled to said shaft of said regulating assembly such that each of said seeding assemblies is alignable with one of said indentations, each of said indentations aligned with one of said seeding assemblies being adapted for collecting one of the seeds from said hopper of the associated one of said seeding assemblies and transferring the seed from said hopper to said dispensing portion when said shaft of said regulating assembly is rotated with respect to the seeding assemblies;

said regulating assembly having a plurality of wheels, each of said wheels being couplable to opposing ends of said shaft of said regulating assembly, said wheels being adapted for extending beyond opposing sides of the flat such that said wheels permit said seeding assemblies to be advanced across the flat and rotate said shaft of said regulating member for regulating a seed from each of said seeding assemblies being deposited into an associated one of the depressions of the flat;

a tray member being adapted for receiving the flat, said tray member having a pair of side portions, each of said side portions being positioned adjacent opposing side edges of a support portion of said tray member such that said flat is positioned between said side portions when said support portion of said tray member is supporting the flat, each of said wheels engaging one of said side portions of said tray member such that each of said wheels rolls along the associated one of said side portions adapted for guiding said seeding assemblies over the flat; and said tray member having a plurality inserts, each of said side portions of said tray member having a channel such that said channel of each of said side portions receives one of said inserts, each of said inserts having a plurality of holes, said holes being positioned in a spaced relationship along a length of the associated one of said inserts, each of said holes receiving one of a plurality of teeth of the associated one of said wheels for maintaining alignment of each of said wheels with said side portions of said tray member.

15. The seed planting system as set forth in claim 14, further comprising:

said plurality of wheels being arranged in a plurality of wheel sets, said wheels of each of said wheel sets having a diameter unique from a diameter of said wheels of each other of said wheel sets such that said wheels of each of said wheel sets rotates said-shaft at a different rate than each other of said wheel sets for dispensing seeds at different intervals when said wheels of the associated wheel set are coupled to said shaft.

16. The seed planting system as set forth in claim 14, further comprising:

said plurality of indentations being arranged in a plurality of indentation sets, each of said indentations of each of said indentation sets having a unique diameter from the other of said indentations of the associated one of said indentation sets such that each of said indentations of the associated one of said indentation sets is adapted for collecting seeds of a size less than the diameter of the associated one of said indentations of said indentation sets for inhibiting more than one seed being collected.

17. The seed planting system as set forth in claim 14, further comprising:

said dispensing portion of each of said seeding assemblies having a dispensing tube, said dispensing tube having a lumen in communication with the associated one of said indentations of said shaft when the associated one of said indentations is rotated past said hopper of the associated one of said seeding assemblies, said dispensing tube being adapted for dispensing a seed collected by the associated one of said indentations into one of the depressions of the flat when the associated one of said indentations is rotated past said hopper of the associated one of said seeding assemblies.

18. A seed planting system for planting seeds in dirt positioned in depressions in a flat, said seed planting system comprising:

a plurality of seeding assemblies each having a hopper, said hopper being adapted for holding the seeds, each of said seeding assemblies having dispensing portion, said dispensing portion being coupled to said hopper of an associated one of said seeding assemblies such that said dispensing portion is adapted for dispensing seeds from said hopper of the associated one of said seeding assemblies into the depressions of the flat;

a regulating assembly being coupled between said hopper and said dispensing portion of each of said seeding assemblies such that said regulating assembly is adapted for regulating the rate at which the seeds are dispensed from said hopper to said dispensing portion of the associated one of said seeding assemblies;

a handle member being coupled to each of said seeding assemblies, said handle member being adapted for being gripped by a user such that said handle member permits the user to control said seeding assemblies when said seeding assemblies is passed over the flat;

said handle member having a hand portion and a connection portion, said connection portion being for coupling to said seeding assemblies, said hand portion extending from said connection portion opposite said seeding assemblies, said hand portion being adapted for being engaged by the hand of the user when the user wishes to deposit seeds in the depressions of the flat; and said connection portion of said handle member having a plurality of slots, each of said seeding assemblies being selectively positionable adjacent one of said slots, a plurality of fastener members extending through said slots into the associated one of said seeding assemblies for coupling said seeding assemblies to said connection portion of said handle member, each of said seeding assemblies being laterally positionable along a length of the associated one of said slots.

* * * * *